United States Patent [19]
Koenig

[11] 4,355,774
[45] Oct. 26, 1982

[54] PARACHUTE INFLATION ASSISTANCE DEVICE

[76] Inventor: Garland C. Koenig, 1845 Tara Dr., Prattville, Ala. 36067

[21] Appl. No.: 187,795

[22] Filed: Sep. 16, 1980

Related U.S. Application Data

[63] Continuation-in-part of Ser. No. 19,627, Mar. 12, 1979, abandoned.

[51] Int. Cl.³ .................. B64D 17/02; B64D 17/62
[52] U.S. Cl. ................................ 244/145; 249/149; 249/152
[58] Field of Search ............... 244/142, 145, 146, 149, 244/152

[56] References Cited

U.S. PATENT DOCUMENTS

| | | | |
|---|---|---|---|
| 1,194,691 | 8/1916 | Adams | 244/152 |
| 1,737,913 | 12/1929 | Broadwick | 244/145 |
| 2,734,706 | 2/1956 | Jalbert | 244/145 |
| 2,974,913 | 3/1961 | Steinthal | 244/145 |
| 3,420,478 | 1/1969 | Ferguson | 244/145 |

FOREIGN PATENT DOCUMENTS

| | | | |
|---|---|---|---|
| 478191 | 10/1951 | Canada . | |
| 1015499 | 10/1952 | France | 244/149 |
| 1165812 | 10/1958 | France | 244/145 |
| 1295993 | 5/1962 | France | 244/145 |
| 313708 | 6/1956 | Switzerland | 244/145 |

*Primary Examiner*—Charles E. Frankfort
*Attorney, Agent, or Firm*—Woodford R. Thompson, Jr.

[57] ABSTRACT

This is an improvement in circular canopies of the flat, conical, or hemispherical type, some of which have extended skirts with the canopies being of gore construction. External additional gores of porous material cover selected canopy gores and are arranged to insure circular balance of the canopy. Each external gore covering is mounted on radial seams of the canopy gore which it covers beginning at a point above the canopy skirt and extending along the radial seams and across the apex hem to define a compartment for accepting external air flow turbulence existing on the elongated canopy prior to normal inflation. The external gore is closed at the top thereof and incorporates an anti-oscillation vent with the lower end thereof being open and terminating at an elevation of approximately 4 to 14 inches above and in spaced relation to the skirt of the canopy.

12 Claims, 10 Drawing Figures

PARACHUTE INFLATION ASSISTANCE DEVICE

CROSS-REFERENCE TO RELATED APPLICATION

This application is a continuation-in-part of my prior application Ser. No. 019,627, filed Mar. 12, 1979 and entitled PARACHUTE INFLATION ASSISTANCE DEVICE, now abandoned.

In addition to the references cited in my prior application No. 019,627 I would like to make of record the following references: French Pat. Nos. 1,092,383 (Lemoigne) and No. 1,416,429 (Persyn) and U.S. Pat. Nos. 1,864,298 (DeWitt), 1,872,705 (Elliott) and 2,283,479 (Westenhauer).

BRIEF SUMMARY OF THE INVENTION

The object of this invention is the provision of a non-mechanical, non-pyrotechnic device to insure the full, rapid and uniform inflation of canopies deployed at altitudes above ground level in the 200–300 feet range.

The parachute inflation assistance device when applied to circular canopies of the flat, conical or hemispherical type of gore construction, rapidly opens the canopy at the skirt first, forcing the canopy to fill from the skirt upward to the apex in a rapid filling sequence. The partially entrapped column of air in the compartment defined between an external gore and the canopy gore which it covers increases the buoyancy of the canopy since the upper end of this compartment is closed and the lower end thereof is open and terminates at an elevation of approximately 4 to 14 inches above the skirt of the canopy. An anti-oscillation vent slot in the device aids in eliminating oscillation common to conventional designs. Excellent canopy balance, for example, may be achieved by construction of external gore coverings on every fourth gore on a 28 gore canopy and on every sixth gore on a 30 gore canopy beginning with either gore number 1 or the last numbered gore.

Figure 3:
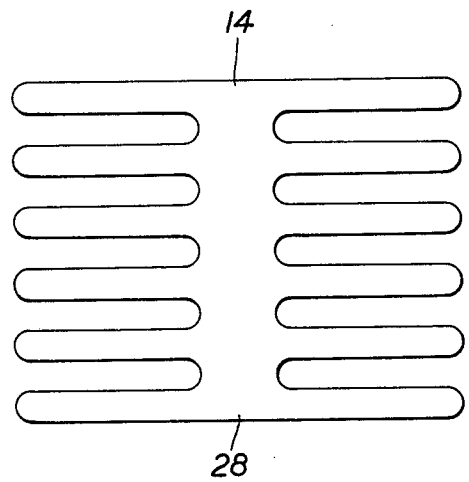
FIG. 3 is an exaggerated schematic view showing the interior of a conventional parachute at the skirt after packing, with the numbers 14 and 28 being gore numbers assigned at the time of original manufacture.
Figure 4:
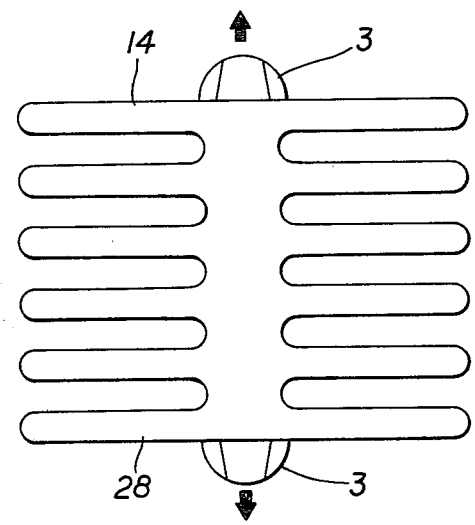
FIG. 4 illustrates the inflation assistance device 3 opening as line stretch occurs while the arrows indicate the direction of pull from the center of the folded skirt.
Figure 5:
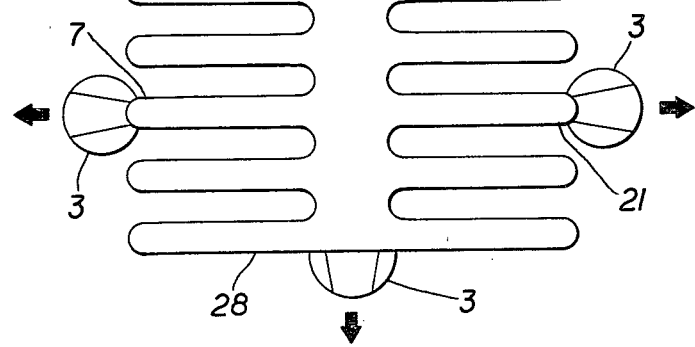
Figure 6:
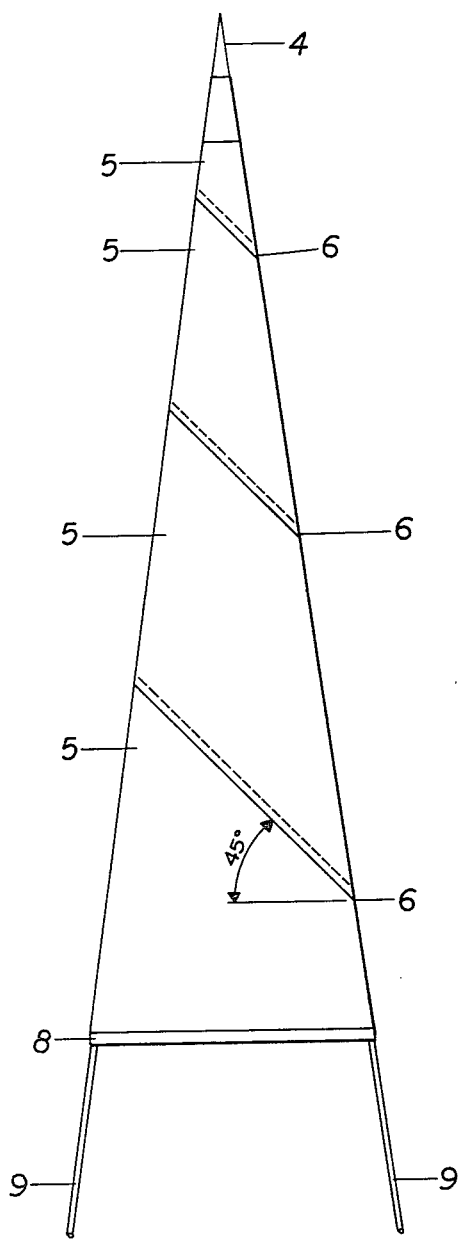
Figure 7:
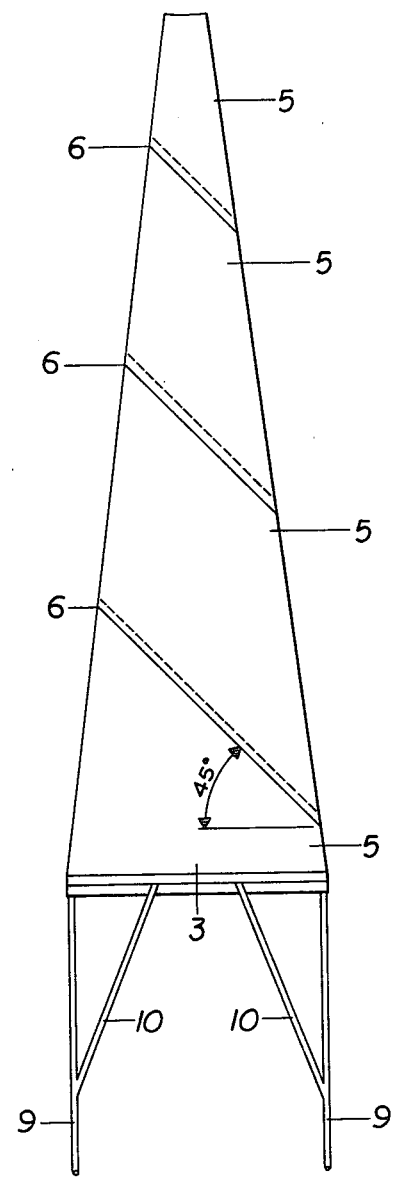
Figure 8:
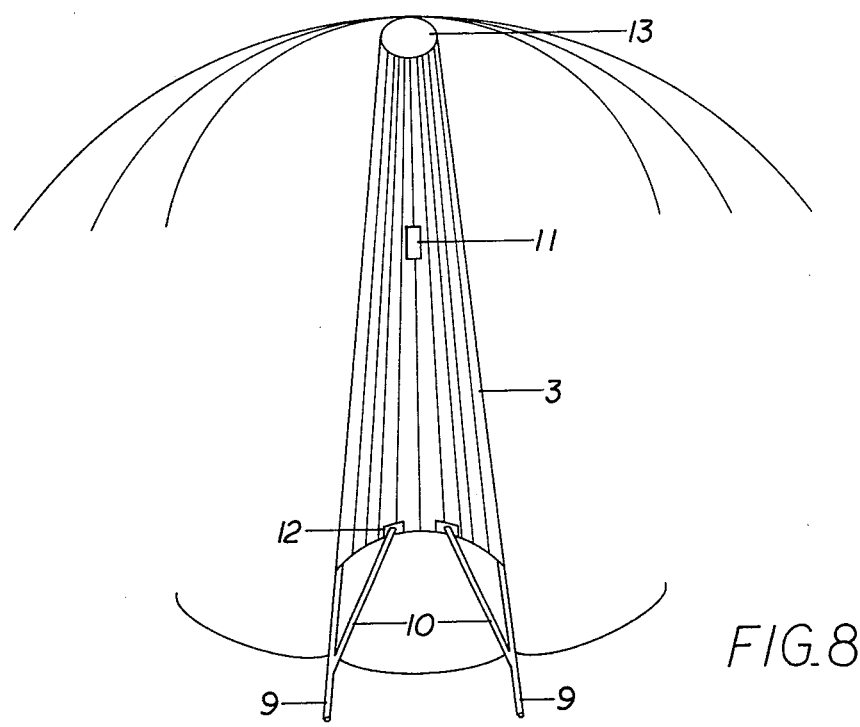
Figure 9:
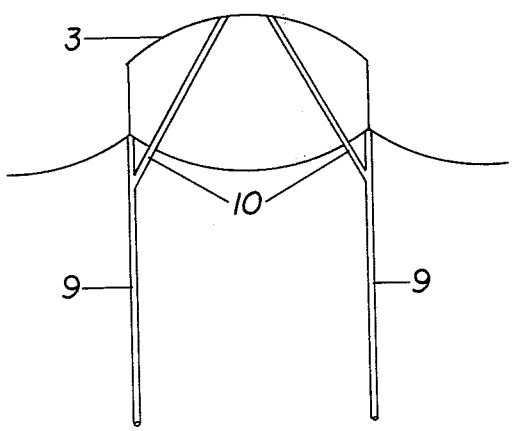
Figure 10:
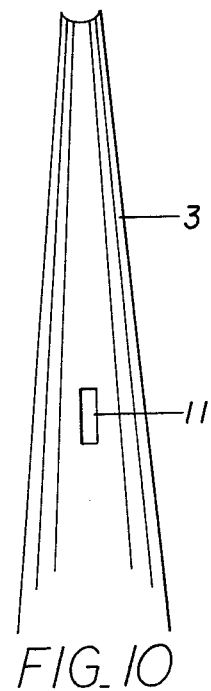

FIG. 5 shows my assistance device 3 on gore numbers 7 and 21 pulling horizontally, as indicated by the arrows, while my device on gore numbers 14 and 28 pull in an opposing vertical direction. FIGS. 3, 4 and 5, in total, thus illustrate the skirt being pulled open by the exterior air inflation of my assistance device;

FIG. 6 is a side elevational view of a conventional gore with the lateral band being shown at 4;

FIG. 7 is a side elevational view of the parachute inflation assistance device which is used to cover the gore shown in FIG. 6;

FIG. 8 is an elevational view showing an installed assistance device on an inflated canopy beginning at the apex 13 and showing the location of the vent slot at 11, while 12 represents the junctions of attachment of retention lines 10 to my assistance device 3 and suspension lines 9;

FIG. 9 shows the air flow access opening of my assistance device 3 and the attachment of the assistance device retention lines 10 from the assistance device 3 to the canopy suspension lines 9; and FIG. 10 illustrates the assistance device 3 and the placement of the anti-oscillation vent slot 11.

DETAILED DESCRIPTION

Figure 2:
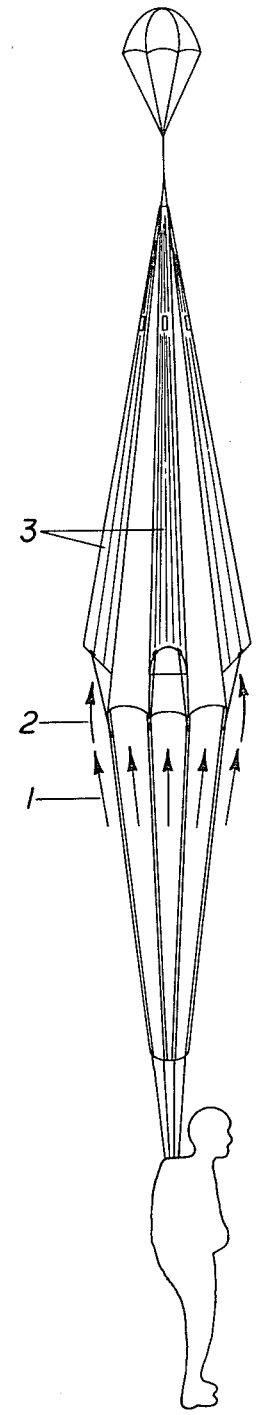
FIG. 2 illustrates the air flow activation of my parachute inflation assistance device.

As shown in FIGS. 2, 6 and 7 my parachute inflation assistance device 3 is a nylon cloth or other porous material fabricated parachute canopy gore-covering designed for actuation by air turbulence 2 on the canopy exterior surface. It extends from the upper lateral band 4 on the covered gore 7 downward to a point ranging from approximately 4 to 14 inches above the skirt 8 of the canopy. With a circular canopy, optimum placement of my parachute inflation assistance device is at a location for it to extend downward to a location approximately 8 to 9 inches above the skirt of the canopy. With a hemispherical canopy, I have found that optimum placement of my assistance device is at a location for it to extend downward to a location ranging from approximately 8 to 12 inches above the skirt of the canopy.

The gore is constructed of 1.1 oz. ripstop nylon or other low porosity material, and contains three or four sections 5 cut on a 45 degree bias. The construction may also be of block construction. These sections 5 are joined with diagonal seams 6 utilizing nylon thread, size E, a 301 stitch, 7–11 stitches per inch on two parallel rows. The assistance device 3 is sized according to the gore it will cover on a given canopy. This size or width of the assistance gore is calculated from the upper lateral band 4 at a ratio of approximately 2:1 to the gore being covered, and it flares along the radial seams of sections 5 to a point ranging from approximately 4 to 14 inches above the skirt 8 of the main canopy. The ratio of the width of the bottom of the assistance device to the bottom of the main canopy gore is approximately 1.22:1. On a hemispherical canopy the ratio of the width of the bottom of the assistance device to the width of the gore of the main canopy at the lower end of the assistance device is approximately 1.44:1.

ATTACHMENT TO EXISTING CANOPIES

When constructing my assistance device for attachment to a previously manufactured canopy, I allow approximately 1¼ inches excess of material along the radial seams, wherein an English Fell seam of ½ inch is employed. I then join the radial seams with a nylon thread, size E, utilizing a 301 stitch, 7–11 stitches per inch and double rows on both sides of the suspension line channels. The assistance device is closed at the apex in the same manner. The attachment of retention lines 10 is described below.

MANUFACTURE OF NEW CANOPIES

In the manufacture of new canopies, the normal gore and the assistance device gores are joined at the radial seams with a seam in the same manner as above. The skirt of the assistance device is reinforced with one-inch nylon tape, folded equally, and utilizing nylon thread and a 301 stitch, stitched in four rows with 7–11 stitches per inch.

The assistance device retention lines 10 are taken from suspension line stock rated at 550 lbs. tensile strength. Preferably, attachment of the retention lines 10 at the skirt is accomplished four inches left and right of the longitudinal center of the assistance device, as shown in FIGS. 8 and 9, utilizing nylon tape ½ inch wide×2½ inches long to form a V tab. The retention line is laid on the skirt, covered with the tape and sewn with nylon thread, size E, using a 309 stitch with six rows and 7-11 stitches per inch. The length of each retention line 10 is preferably approximately thirty inches on circular canopies of the flat and conical type and approximately forty-four inches on a hemispherical canopy. It is attached to the suspension line 9 by a finger trap ½ inch (not shown), utilizing a 308 stitch, nylon thread, with 7-11 stitches per inch. It will thus be seen that the retention lines 10, being held taut by the suspension lines, prevent the mouth of my device from blowing back or lying down on the gores at high and low speeds, respectively. The portion of the assistance device is thus held in the form of a constant arc, as shown in FIGS. 8 and 9. This also prevents the eddying air turbulence 2 from jumping over the lower end of the device.

An anti-oscillation vent slot 11 is provided for release of air captured in the assistance device, as shown in FIG. 10. The slot 11 is located in the upper one-third portion of my parachute inflation assistance device, with the specific location being determined by the maximum lift desired. For example, I have found that a location of the slot 1 at approximately thirty-eight inches below the upper lateral band 4 is the preferred placement for a vent slot approximately one inch wide, five inches long and located astride the 90° center or longitudinal center of the external gore. The size of the vent slot 11 relative to the size of the opening at the lower end of the assistance device 3 is based on the ratio of the size of the opening at the apex of the parachute canopy to the size of the opening at the skirt thereof. That is, the size of the opening at the apex of the parachute canopy is to the size of the opening at the skirt thereof as the size of the vent slot 1 is to the size of the opening at the lower end of the assistance device 3. The vent slot 11 is reinforced with ½ inch nylon tape, folded equally and attached with a 301 stitch, nylon thread, size E, with double rows of 7-11 stitches per inch.

TESTING RESULTS

Actual testing of my parachute inflation assistance device, as applied to circular canopies of the flat, conical and hemispherical type have been made. The purpose of the tests was to determine first, optimum placement of the external gore on circular canopies of the flat, conical and hemispherical type; placement of the external gore in relation to the skirt of the circular canopy as is applicable to the principle of controlling ram air. The ram air is a direct result of capturing and utilizing a vortex or air turbulence existing on the outer surface of an elongated canopy prior to inflation. The purpose of capturing this vortex is to harness it in such a manner as to provide for positive inflation of the canopy by pulling the skirt apart; structurally strengthening the canopy during rebound; rapidly establishing design angles and reducing the rate of descent. Secondly, these tests were designed to learn the minimum and maximum locations ram air can be utilized by placement of the opening of the external gore in relation to the skirt of the circular canopy, thereby producing the desired results.

Tests were conducted with placement of the external gore opening on the skirt of the circular canopy upward to 16 inches above the skirt. It was learned that an acceptable range of the external gore opening placement in relationship to the skirt is from approximately 4 inches above the skirt to approximately 14 inches above the skirt. When the placement of the opening is below the 4 inch location the parachute inflation assistance device failed to activate sufficiently during opening. With placement of the opening of the external gore above the 14 inch location, the device began to cause unacceptable oscillation of the canopy.

The following is a chart indicating the general tests results:

| | Temperature Range: 84° F.-98° F. Barometric Pressure: 29.95-31.00 Winds: 2-11 m.p.h. | |
| --- | --- | --- |
| Test No. | Placement of External Gore | Results |
| 1. | On skirt. | Partial inflation of external gore inflation during deployment but not enough to insure desired opening characteristics. Flattening of the external gore indicated. |
| 2. | 2 inches above skirt. | External gore inflation improves slightly at opening; however not enough to insure desired opening characteristics. |
| 3. | 4 inches above skirt. | External gore activation during opening improves to acceptable performance. |
| 4. | 6 inches above skirt. | External gore activation is acceptable indicating all the desired results. |
| 5. | 8 inches above skirt. | External gore activation is acceptable indicating all the desired results. |
| 6. | 10 inches above skirt. | External gore activation is acceptable indicating all the desired results. |
| 7. | 12 inches above skirt. | External gore activation is acceptable indicating all the desired results. |
| 8. | 14 inches above skirt. | External gore activation acceptable; however canopy oscillation increased. |
| 9. | 16 inches above skirt. | External gore began to cause unacceptable oscillation of the canopy. |

The above tests were conducted on a daily basis with drops in the morning and afternoon. These were dummy drops from an aircraft moving at 115 m.p.h. to 135 m.p.h. indicated air speed at an altitude of 300 feet above sea level. Each drop was filmed on 16 mm film at 64 frames per second. Prudent judgment dictated that the tolerance at two inch intervals was not so critical as to require testing at reduced intervals.

From the foregoing it will be seen that I have devised an improved inflation assistance device for parachutes used for the transport of humans or other loads from an aircraft, balloon or the like to the ground. The conventional, circular canopy of the flat, conical and hemispherical type, some with extended skirts, open slowly as air enters the air channel and travels to the apex thereof, thereby the volume increasingly spreads the canopy open downward to the juncture of the skirt and suspension lines. This is a time-consuming process and will not occur while the canopy is transverse to the wind or the flow of air relative thereto.

Figure 1:
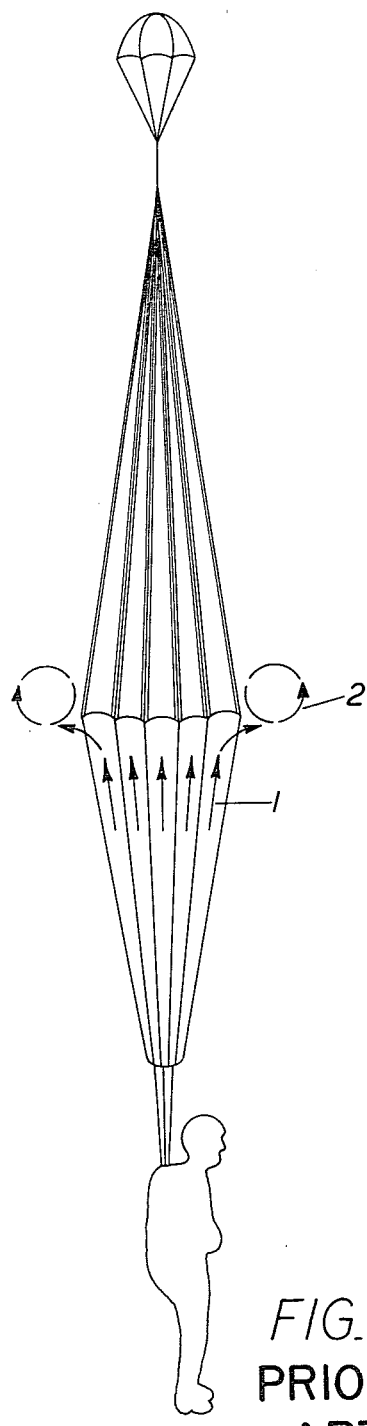
FIG. 1 illustrates a conventional canopy while in an elongated profile and diagrammatically shows the movement of air flow 1 at the canopy skirt which creates an air turbulence 2 on the exterior of the canopy.

With my improved inflation assistance device, as the canopy is released for use, it initially assumes a state approximately as shown in FIGS. 1 and 2. The relative movement of air is upward in those views, and upon reaching the more-or-less bunched lower end of the canopy, is diverted outwardly, with a certain amount of turbulence. In the present case illustrated in FIG. 2, this air is, at least in part, caught by the lower edges of the assistance gores. This collected or trapped air inflates the gores quickly, causing them to seek the shapes for which they are out and sewn, which means that they spread the open end of the canopy very quickly, enhancing the speed at which the parachute opens. The inflation rate is increased by capturing the air turbulence existing on the exterior of the cnopy above the skirt. My invention thus provides a life saving capability within the 200 foot range. Also, I significantly reduce the low altitude rate of descent of the load since the external gores entrap additional air about the canopies. At the same time the canopies are strengthened by the action of the inflated gores as stiffeners to the canopy. This effect also eliminates flattening effect during rebound. Furthermore, I reduce oscillation significantly on circular canopies of the flat, conical and hemispherical type here oscillations of ±30 degrees are inherent design limitations.

A still further advantage in my improved inflation assistance device is that it provides for multidirectional opening of the skirt of the canopy immediately thereby separating the suspension lines and the fabric and in so doing significantly reduces the opportunity for canopy malfunction through line fabric entanglements and inversion of the skirt area fabric upward into the interior of the canopy.

While I have shown my invention in but one form, it will be obvious to those skilled in the art that it is not so limited, but is susceptible of various changes and modifications without departing from the spirit thereof.

What I claim is:

1. In a parachute inflation assistance device for use on a circular canopy having a skirt at the lower end thereof and a lateral band at the upper end thereof,
   (a) external gores covering selected areas of said circular canopy with each said external gore having lateral edges which flare downwardly from said upper lateral band and terminate at an elevation ranging from approximately 4 to 14 inches above and in spaced relation to the skirt of said circular canopy,
   (b) means joining said lateral edges of each said external gore to the adjacent surface of said circular canopy which it covers with the width of said external gore being greater than that of said surface which it covers to define a generally radially extending compartment therebetween having an upper closed end and an open lower end, each said compartment quickly filling with air upon parachute extraction so as to rapidly open said canopy at the skirt first thereby forcing the canopy to fill from the skirt upwards to the apex in a rapid filling sequence, and
   (c) there being an anti-oscillation vent slot in the upper one-third portion of each said external gore for release of air from said compartment defined between said external gore and the surface of said circular canopy which it covers.

2. A parachute inflation assistance device as defined in claim 1 in which the lower end of each said external gore on conical and flat circular canopies terminates at an elevation ranging from approximately 8 to 9 inches above and in spaced relation to the skirt thereof.

3. A parachute inflation assistance device as defined in claim 1 in which the lower end of each said external gore on a hemispherical canopy terminates at an elevation ranging from approximately 8 to 12 inches above and in spaced relation to the skirt of said hemispherical canopy.

4. A parachute inflation assistance device as defined in claim 1 in which the size of said vent slot relative to the size of the opening at said open lower end of said external gore is based on the ratio of the size of the opening at the apex of said circular canopy to the size of the opening at the skirt of said circular canopy.

5. A parachute inflation assistance device as defined in claim 1 in which said anti-oscillation vent slot is located approximately thirty-eight inches below the upper lateral band of said circular canopy.

6. A parachute inflation assistance device as defined in claim 1 in which each said vent slot extends approximately five inches along the longitudinal center of said external gore and is approximately one inch in width.

7. A parachute inflation assistance device as defined in claim 1 in which the width of each external gore on conical and flat circular canopies is calculated at the upper lateral band thereof at a ratio of approximately 2:1 to a canopy gore which it covers and said external gore flares downwardly and radially along said canopy gore where the ratio adjacent the lower end of said external gore is approximately 1.22:1 to the canopy gore which it covers.

8. A parachute inflation assistance device as defined in claim 1 in which the width of each external gore on a hemispherical canopy is calculated at the upper lateral band thereof at a ratio of approximately 2:1 to a canopy gore which it covers and said external gore flares downwardly and radially along said canopy gore where the ratio adjacent the lower end of said external gore is approximately 1.44:1 to the canopy gore which it covers.

9. A parachute inflation assistance device as defined in claim 1 in which retention lines are attached to the lower portion of each external gore at spaced apart locations at opposite sides of the longitudinal center of said external gore and extend to and are attached to adjacent suspension lines for said area of said circular canopy which said external gore covers with said retention lines being of a length to prevent the lower edges of said external gore from folding upwardly on said circular canopy.

10. A parachute inflation assistance device as defined in claim 9 in which said retention lines are approximately thirty inches in length on conical and flat circular canopies.

11. A parachute inflation assistance device as defined in claim 9 in which said retention lines are approximately forty-four inches in length on hemispherical canopies.

12. A parachute inflation assistance device as defined in claim 9 in which said retention lines are attached to the lower portion of each external gore at locations spaced approximately four inches from opposite sides of the longitudinal center of said external gore.

* * * * *